United States Patent [19]

Nagano et al.

[11] 3,953,375

[45] Apr. 27, 1976

[54] NON-LINEAR VOLTAGE TITANIUM OXIDE RESISTANCE ELEMENT

[75] Inventors: Takahiro Nagano; Michio Oue, both of Hitachi, Japan

[73] Assignee: Hitachi, Ltd., Japan

[22] Filed: Feb. 11, 1974

[21] Appl. No.: 441,318

[30] Foreign Application Priority Data

Feb. 9, 1973 Japan................................ 48-15496

[52] U.S. Cl................................ 252/520; 252/518; 252/519
[51] Int. Cl.².......................... H01B 1/06; H01C 1/06
[58] Field of Search.................... 252/520, 518, 519; 338/20; 338/21

[56] References Cited
UNITED STATES PATENTS

| | | | |
|---|---|---|---|
| 3,658,725 | 4/1972 | Masuyama et al.................. | 252/518 |
| 3,687,871 | 8/1972 | Masuyama et al.................. | 252/518 |
| 3,715,701 | 2/1973 | Yperman et al.................... | 252/520 |
| 3,766,098 | 10/1973 | Masuyama et al.................. | 252/520 |
| 3,778,743 | 12/1973 | Kobayashi et al.................. | 252/518 |
| 3,842,018 | 10/1974 | Ichinose et al...................... | 252/518 |

*Primary Examiner*—Leland A. Sebastian
*Assistant Examiner*—Josephine Lloyd
*Attorney, Agent, or Firm*—Craig & Antonelli

[57] ABSTRACT

A sintered, non-linear voltage titanium oxide resistance element, including, as a principal component, titanium oxide, to which are added niobium oxide and bismuth oxide.

15 Claims, 8 Drawing Figures

NON-LINEAR VOLTAGE TITANIUM OXIDE RESISTANCE ELEMENT

BACKGROUND OF THE INVENTION

1. Field of the Invention

This invention relates to a non-linear voltage resistance element which is produced by molding and sintering metallic oxides and adapted for use in lightning arresters, surge absorbers, voltage stabilizing circuits and the like.

2. Description of the Prior Art

Included by the conventional type non-linear voltage resistance elements are:

a. zener diode utilizing 'pn' junction of silicon,
b. sintered silicon carbide body varistor,
c. selenium and copper oxides varistor,
d. sintered zinc oxide body varistor, etc.

Used as criteria for evaluating the characteristics of the above enumerated non-linear voltage resistance elements are a non-linear coefficient $\alpha$ and a limiting voltage $V_T$. The non-linear coefficient $\alpha$ is a value, when the volt-ampere characteristic is represented by the following formula:

$$I = KV^\alpha,$$

wherein $K$ : constant
$I$ : ampere
$V_T$ : voltage impressed on the element (limiting voltage), when the electric current becomes constant which is flowing through the element.

There arise the following problems with the aforesaid elements (a)–(d) from the criteria aforementioned:

The element (a) presents a great non-linear coefficient $\alpha$, while the limiting voltage $V_T$ is limited to from several to several tens of volts, and costly as compared with other elements.

The element (b) presents $\alpha$ of which value is as small as 2 to 3, and, in addition, may present further greater limiting voltage $V_T$, but fails to present a reduced limiting voltage $V_T$. The reason for this is that the thickness of an element can not be reduced up to below 0.5 mm, since the particle size of silicon carbide is as large as about 100 $\mu$.

The element (c) presents $\alpha$ of which value is as small as 2 to 3, and the limiting voltage $V_T$ thereof is high due to the use of a potential barrier at the contact portion between the metal and the semiconductor.

The element (d) presents $\alpha$ of which value is as large as 10 to 50, and the limiting voltage may be varied from 10 to 1,000 volts, owing to the particle size being as small as about 10 $\mu$. However, the element has a disadvantage in that the non-linearity thereof is susceptible to deterioration due to the fact that zinc oxide, which is a principal component of the element, is chemically unstable.

Most promising from the above evaluation is a varister prepared from sintered zinc oxide (d). Generally, a sintered zinc oxide varister comprises aggregated particles of zinc oxide having relatively low electric resistance, around which each particle there is formed a thin particle boundary layer of a high electric resistance produced by the reaction of zinc oxide with added compounds. Thus, when the voltage is impressed on the varister, the aforesaid particle boundary layers no longer hinder the voltage with the result that the varister attains low conductivity. In referring to the structure described above, it is contemplated to provide a non-linear voltage resistor element by forming particle boundary layers of a high electric resistance around particles of a metallic oxide from which oxygen is harder to be free than from zinc oxide.

SUMMARY OF THE INVENTION

It is a principal object of the invention to provide a non-linear voltage resistance element having a high non-linear coefficient $\alpha$.

It is another object of the invention to provide a non-linear voltage resistance element in which a non-linear coefficient is susceptible to a small time-dependent change.

It is a further object of the invention to provide a sintered, non-linear voltage resistance element provided with electric terminals which includes titanium oxide as a principal component, and bismuth oxide and niobium oxide respectively as added components.

DESCRIPTION OF THE PREFERRED EMBODIMENTS

Figure 1:
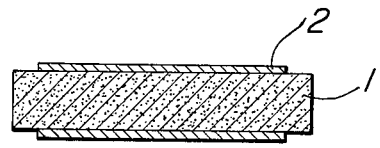
FIG. 1 is a longitudinal cross-sectional view of a non-linear voltage resistance element embodying the present invention.

According to the present invention, titanium dioxide is used as a starting material. When titanium dioxide is burnt in air, then it attains a specific electric resistance of over $10^{10}$ ohms which is close to that of an insulating material. On the other hand, when it is burnt in non-oxidizing atmosphere, it attains a specific electric resistance in the order of $10^2$ ohms and, in addition, when it is again burnt in an oxidizing atmosphere, the specific electric resistance thereof will increase. While titanium oxide forms solid solutions with various metallic oxides, it rarely forms semiconductors. Accordingly, titanium oxide can not be used intact as a fundamental starting material for a non-linear resistance element such as a conventional zinc oxide varister.

According to the present invention, titanium oxide is used as a basic compound for a non-linear resistance element to form a non-linear resistance element, itself. To this end, according to the present invention, titanium oxide is burnt in a non-oxidizing atmosphere, such as for instance, in a nitrogen atmosphere, or an amount of metallic oxide of pentavalency is added internally in part of titanium oxide to obtain electric conductivity and then forms a non-linear voltage resistance element.

More specifically, given amounts of metallic oxide powder having low melting points and metallic oxide powder of pentavalency are added to titanium oxide powder, followed by mixing, molding and sintering.

Included by titanium oxides which can be utilized in the present invention are titanium oxide or the oxides which have less amount of combined oxygen than that of titanium oxide, such as those which have been baked in non-oxidizing atmosphere. The ratio of combined oxygen to titanium in such titanium oxide is less than 2.

Included by the metallic oxide of pentavalency is niobium pentaoxide. Niobium trioxide may be used as niobium oxide. When niobium trioxide is baked in an oxidizing atmosphere, it will be converted into niobium pentaoxide. Thus, it may be used in part of the production process according to the present invention.

Bismuth oxide, which is metallic oxide powder having a low melting point, may be melted along with other metallic oxides. Titanium oxide will produce a less amount of solid solution with bismuth oxide than with niobium oxide. Also bismuth oxide produces a melt with niobium oxide at a relatively low temperature.

In contrast thereto, with metallic oxides which produce a greater amount of solid solution with titanium oxide or metallic oxides which themselves have a low electric resistance, there are provided varisters which present no non-linear voltage characteristics or, if any, a low non-linear coefficient $\alpha$.

The sintering temperature used is no higher than the melting point of titanium oxide, but no lower than the temperature at which a melt of metallic oxides is produced, and more specifically is in the range from 1,000° to 1,400°C. If such temperature range is exceeded, there will not be produced a melt of metallic oxides to the complete extent, and thus it fails to present a substantially high non-linear coefficient $\alpha$. On the other hand, if the sintering temperature is too high, then a part of metallic oxide evaporates with the result that the product is an ordinary resistor. The period of time for sintering is substantially as long as that for sintering to manufacture ordinary products, and is from 1 to 4 hours.

A sintering atmosphere may be an air atmosphere as well as non-oxidizing gas atmosphere. The non-oxidizing gas atmospheres which can be utilized in the present invention comprises such gas as nitrogen gas, inert gas, ammonia decomposed gas, hydrogen gas and the like. The non-oxidizing gas atmosphere contributes greatly in rendering titanium oxide a semiconductor.

Titanium oxide which is rendered semiconductor under this treatment has a combined ratio of oxygen atoms less than 2.

After the completion of sintering, electrodes may be suitably formed on a sintered body as by coating and baking silver paste on the opposite sides of the sintered body, or vacuum evaporating and baking electrically conductive metals thereon. While the atmosphere for the baking of electrodes may be arbitrarily selected, it is recommendable to utilize non-oxidizing atmospheres at a temperature above 700°C for obtaining excellent non-linear voltage resistance element.

When the baking of electrodes is carried out in air or an oxidizing atmosphere at a temperature above 700°C, titanium oxide is obtained which has electric resistance as high as that of titanium oxide which have been subjected to sintering in air atmosphere. The maximum temperature for the baking of electrodes is the same as that for the sintering. Thus, if such a temperature is exceeded, there results in a resistor being produced due to the action similar to the phenomenon caused by the sintering.

On the other hand, it sometimes happens that there is produced a shot-key barrier between titanium oxide and electrodes depending on the material for electrodes used, but it exerts no influence on the characteristic of the non-linear resistor according to the present invention.

The non-linear resistance element of the invention is considered to owe its characteristics to the following microscopic structure.

Titanium oxide, niobium oxide and bismuth oxide which are used as starting materials are in the form of powder of which particle size is from 50 to 325 mesh. Thus, the formed body presents a structure in which powder of niobium oxide and bismuth oxide is arranged around the titanium oxide particles in close contact relation thereto. Before subjecting to sintering, the formed body somewhat has a certain degree of porosity, to which the atmospheric gas acts to affect the resulting electric resistance prior to the melting of metallic oxides. In case the atmospheric gas is air, oxygen gas atoms penetrate into titanium oxide so as to supplement the shortage of oxygen in titanium oxide, and thus the electric resistance will be improved to some extent. In case atmospheric gas is non-oxidizing, shortage of oxygen in titanium oxide will be maintained intact, or oxygen is removed to increase the extent of oxygen shortage, so that the electric resistance of titanium oxide will be lowered. If this is subjected to sintering, the grain growth of titanium oxide will result as the sintering proceeds, whereby the surface area thereof will be decreased. Bismuth oxide and niobium oxide will be melted through sintering, and niobium oxide begins to dissolve into titanium oxide, while the remainder of niobium oxide and bismuth oxide are partially in contact with titanium oxide. As the sintering proceeds, the surface area of granular titanium oxide will be decreased, and then the contact area of the aforesaid oxides with titanium oxide will be increased, whereby eventually the aforesaid oxides come to surround titanium oxide particles. When the sintered body is cooled, niobium oxide contained in titanium oxide is discharged due to a decrease in solubility of titanium oxide, thus dissolving into bismuth oxide, and eventually the whole body is solidified, thereby presenting an aggregated body of such a structure that the melt of bismuth oxide and niobium oxide having a high electric resistance surround each particle of titanium oxide.

The aforesaid aggregated body is considered to show a non-linear voltage characteristic for the following reasons:

Titanium oxide particles present low electric resistance due to the sintering treatment, and layer of the melt of niobium oxide and bismuth oxide having a high electric resistance surround the titanium oxide particles. The two titanium oxide particles represent a body of a high electric resistance in which there is a barrier comprising layers of a high electric resistance interposed between the two titanium oxide particles. In case voltage is not impressed, the high electric resistance layers present a high conductive level zone, while titanium oxide presents a low conductive level zone, so that there results a considerable difference of conductive level between titanium oxide and high electric resistance layers. When voltage is impressed, the conductive level zone of titanium oxide comes to close to the high conductive level of the high electric resistance layers, whereby the difference will be narrowed. As a result, electrons jumping over a high conductive level will be increased in number, so that they appear as a minute electric current in a so-called low voltage zone. When voltage is further increased, the conductive level of titanium oxide on one hand approximates the prohibiting zone level of titanium oxide on the other hand, and the electric current abruptly begins to flow due to a so-called tunnel effect. When the impression of voltage is interrupted, the conductive zone level of titanium oxide will be restored to the initial condition. In practice, the non-linear voltage resistance element of titanium oxide is an aggregated body consisting of high electric resistance layers and a multiplicity of titanium oxide particles, in which those particles and high electric resistance layers are connected in series between electrodes positioned at the opposite edges of a non-linear voltage resistance element. Accordingly, the threshold voltage (voltage at 1 mA), at which electric current abruptly begins to flow through a non-linear voltage resistance element of titanium oxide is increased in proportion to the number of pairs of series connections of titanium oxide with high electric resistance layers. The non-linear voltage resistance element of titanium oxide according to the present invention presents a threshold voltage of about 4 volts per high electric resistance layer.

The non-linear voltage resistance element of the present invention may not provide a non-linear voltage characteristic depending on the conditions in manufacture. The melting point of titanium oxide is 1,640°C. If a mixed formed body of titanium oxide, niobium oxide and bismuth oxide is sintered at temperature above the melting point, then titanium oxide will be melted into glass, thereby providing a mere resistor having a high electric resistance. In case the amount of bismuth oxide and niobium oxide relative to the amount of titanium oxide are superfluous, the thickness of a high electric resistance layer surrounding titanium oxide particles will be increased, thereby providing a resulting resistor similar to insulating material. In case niobium oxide or bismuth oxide is added separately, the resulting product will not provide a high voltage non-linear characteristic resistor, but provide an ordinary resistor. For achieving non-linear voltage characteristics, it is imperative to mix both bismuth oxide and niobium oxide with titanium oxide.

According to the present invention, either the conversion of niobium oxide into a solid solution or the sintering of the oxide in a non-oxidizing atmosphere can alternatively be selected for making titanium oxide a semiconductor. The sintering of titanium oxide in a non-oxidizing atmosphere is superior to the conversion of the oxide into a solid solution in making titanium oxide a semiconductor. The mechanism for making a semiconductor from titanium oxide through the sintering thereof in a non-oxidizing atmosphere is owing to the fact that titanium oxide becomes an 'n' type semiconductor because of maintaining or increasing oxygen shortage. However, in practice, during the manufacture of the non-linear voltage resistance elements, dissolving niobium oxide into a solid solution takes place at the same time, so that niobium oxide makes a semiconductor more sufficiently. Accordingly, when the mixture of titanium oxide and niobium oxide is sintered in an air atmosphere as in the present invention, there will be obtained a semiconductor in which niobium oxide is dissolved as a solid solution in titanium oxide, thus presenting a non-linear coefficient $\alpha$ of from 3 to 6. In contrast thereto, in case of sintering in a non-oxidizing atmosphere, the both compounds make a semiconductor, with the result that a non-linear coefficient $\alpha$ of the resulting product will be from 3 to 16. On the other hand, if oxidizing gases are introduced into a non-oxidizing atmosphere, the resulting semiconductor is affected depending on the amount of mixed oxidizing gases. For this reason, it is preferable that oxidizing gases should not be used for obtaining a non-linear voltage resistance elements having a high non-linear coefficient $\alpha$.

Meanwhile, the non-linear coefficient $\alpha$ of non-linear voltage resistance elements for use in a lightning arrester may be more than 2, and, in general, in the range from 2 to 4. Those commercially available give a coefficient in the order of 3. This is because the arrester utilizes a discharging gap, so that non-linear voltage resistance elements may be relieved of its share due to such a design.

Meanwhile, the non-linear coefficient $\alpha$ of small-sized electric parts falls in the range of more than 3. The non-linear voltage resistance elements are used for the protection of transistors included in such parts. In general, zenor diodes find their use in a low voltage circuit, while silicon carbide varisters find its use in a high voltage circuit. However, in case the characteristics of the aforesaid non-linear voltage resistance elements are unstable, the failure of transistor may be prevented by improving the pressure resisting of transistors in a circuit. Under such conditions, non-linear coefficient $\alpha$ of more than 3 is sufficient, and, usually the coefficient $\alpha$ of from 3 to 4 is used.

A horizontal deflecting circuit in a television is designed so as to discharge an electric current by the use of a non-linear voltage resistance element in the event of the rated voltage being exceeded by 10% thereof to thereby control the image developed in a Braun tube. The non-linear coefficient $\alpha$ of the non-linear voltage resistance element required for maintaining the voltage variation within 10% is more than 10.

With the non-linear voltage resistance elements according to the present invention, the non-linear coefficient $\alpha$ depends on the added amounts of niobium oxide and bismuth oxide. Among the aforesaid applications, in the case of a lightning discharger, the added amount of bismuth oxide is from 0.05 to 10 molar % and that of niobium oxide is from 0.05 to 3 molar %. In the case of small-size electric equipment, the added amount of bismuth oxide is from 0.1 to 10 molar % and that of niobium oxide from 0.1 to 3 molar %. Furthermore, in case it is used as a non-linear voltage resistance element for a horizontal deflecting circuit in a television, the added amount of bismuth oxide is from 1 to 3 molar % and that of niobium oxide from 0.1 to 3 molar %.

When the added amounts of niobium oxide and bismuth oxide are lower than the aforesaid ones, then there will not be obtained a desired non-linear voltage resistance element for desired applications. On the other hand, if the aforesaid amounts are exceeded, the non-linear coefficient will be gradually decreased, and eventually, there comes out an ordinary resistor. The added amounts of bismuth oxide and niobium oxide which present the best non-linear voltage resistance element are such that the added amount of bismuth oxide is from 1 to 3 molar % and that of niobium oxide from 1 to 3 molar %.

As is clear from the foregoing, the non-linear voltage resistance element according to the present invention is high in oxygen dissociation pressure of titanium oxide, so that the time-dependent change in voltage, that is, in non-linear coefficient is extremely small, thus presenting a long lasting service life. Only the addition of two components, that is, niobium oxide and bismuth oxide suffices to provide a non-linear resistance element, of which the maximum non-linear coefficient $\alpha$ is more than 15.

In contrast thereto, the conventional zinc-oxide non-linear resistance element presents a non-linear coefficient, of which the value is below 10, and is in the order of 12 at the best. Furthermore, since the non-linear voltage resistance element according to the present invention uses ordinary starting materials and is manufactured in a usual manner, there can be obtained inexpensive resistance elements.

The following examples are illustrative of the features of the present invention:

EXAMPLE 1

Figure 2:
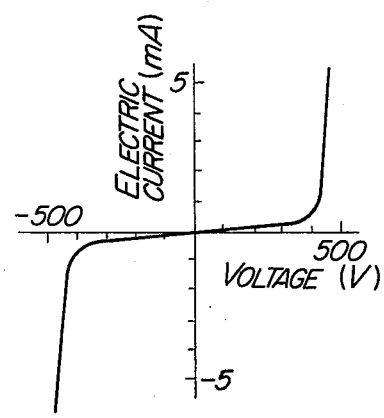
FIG. 2 is a plot showing the current-voltage relationship with a non-linear voltage resistance element according to one embodiment of the invention.
Figure 3:
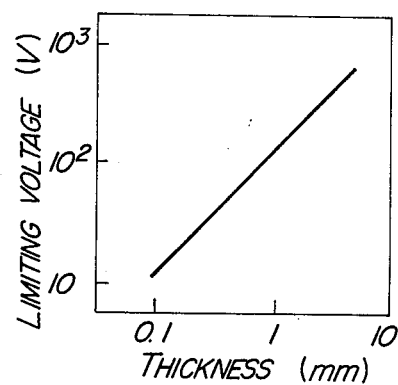
FIG. 3 is a plot showing the relationship between the thickness and the limiting voltage in a non-linear voltage resistance element according to one embodiment of the invention.

Added to special-grade reagent type titanium oxide were niobium oxide and bismuth oxide of predetermined amounts respectively. Water was added to the mixture thus obtained, followed by mixing in a polyethylene container using agate balls for 6 hours. Then, the mixture was placed in a dryer for drying at 130°C for 6 hours. After 2% by weight of water was added thereto, and the mixture was mixed in a crusher for 10 minutes, the mixture was passed through a screen of 42 mesh for granulation. Molding was carried out under a pressure of 750 kg/cm² to dimensions of 12 mm $\phi$ in diameter × 6 mm in thickness. Then, the molded body was baked in a diffusion furnace in a nitrogen gas atmosphere at 1300°C for 1 hour, after which it was slowly cooled down to 400°C at a cooling rate of 1°c./min, and then taken out to atmosphere. The sintered body was subjected to grinding to provide a desired size and thickness, after which aluminum was vacuum evaporated on the surfaces of the sintered body thus prepared to present electrodes. FIG. 1 shows a cross-sectional view of an element thus prepared. Shown at 1 is a sintered body, and at 2 electrodes. FIG. 2 shows current-voltage characteristic curves of an element of 5 mm in thickness, in which niobium oxide and bismuth oxide are added in 1 molar % respectively, and indicates that the element presents a considerable high non-linear characteristic. FIG. 3 shows the relationship between the thickness and the limiting voltage of the same element, and indicates that the limiting voltage is linearly proportional to the thickness thereof, and that the non-linear resistance element is uniform throughout the entire thickness, thus it is becoming clear that the characteristics are based not on the interfaces with electrodes, but on the entire thickness of the resistor. Table 1 shows in summary the non-linear coefficient $\alpha$ of an element which have been prepared with added amounts of niobium oxide and bismuth oxide being varied.

Table 1

|  |  | Niobium oxide (molar %) | | | | | | |
|---|---|---|---|---|---|---|---|---|
|  |  | 0 | 0.05 | 0.1 | 0.3 | 1 | 3 | 5 |
| bismuth oxide (molar %) | 0 | 1 | 1 | 1 | 1 | 1 | 1 | 1 |
|  | 0.05 | 1 | 2 | 2 | 2 | 2 | 2 | 1 |
|  | 0.1 | 1 | 2 | 3 | 3 | 3 | 3 | 2 |
|  | 0.3 | 1 | 4 | 5 | 5 | 8 | 6 | 2 |
|  | 1 | 1 | 8 | 10 | 10 | 15 | 12 | 3 |
|  | 3 | 1 | 7 | 10 | 10 | 15 | 12 | 3 |
|  | 10 | 1 | 3 | 5 | 5 | 7 | 5 | 2 |
|  | 20 | 1 | 1 | 1.5 | 2 | 2 | 2 | 1 |

As can be seen from Table 1, an element including either of the compounds, that is, niobium oxide or bismuth oxide presents no non-linear characteristics, as well shown in the columns of zero molar % of added amount of the either compound. In conclusion, the non-linear characteristic may be produced only by the addition of both bismuth oxide and niobium oxide. In case the added amount of bismuth oxide is from 0.3 to 10 molar % with a relatively low content of niobium oxide, the non-linear coefficient $\alpha$ presents high values. However, if the amount of bismuth oxide exceeds 3 molar %, the decreasing rate of non-linear coefficient $\alpha$ is abruptly marked. Accordingly, it is recommendable that the added amount of niobium oxide be 3 molar %. Meanwhile, the effect due to the addition of bismuth oxide is such that the non-linear coefficient $\alpha$ shows gradual decrease around the range from 1 to 3 molar %, and thus the added amount thereof may be determined commensurate to the aforesaid applications.

EXAMPLE 2

The same procedures were followed except for the use of an air atmosphere, as with Example 1. Table 2 shows the relationship between the non-linear coefficient $\alpha$ of the non-linear resistance element thus obtained and the added amounts of niobium oxide and bismuth oxide. As can be seen from Table 2, there is no outstanding difference from Example 1.

Table 2

|  |  | Niobium oxide (molar %) | | | | | | |
|---|---|---|---|---|---|---|---|---|
|  |  | 0 | 0.05 | 0.1 | 0.3 | 1 | 3 | 5 |
| bismuth oxide (molar %) | 0 | 1 | 1 | 1 | 1 | 1 | 1 | 1 |
|  | 0.05 | 1 | 2 | 2 | 2 | 2 | 2 | 1 |
|  | 0.1 | 1 | 2 | 3 | 3 | 3 | 3 | 2 |
|  | 0.3 | 1 | 3 | 4 | 4 | 6 | 5 | 2 |
|  | 1 | 1 | 5 | 8 | 9 | 10 | 7 | 3 |
|  | 3 | 1 | 3 | 7 | 7 | 10 | 6 | 3 |
|  | 10 | 1 | 2 | 4 | 4 | 4 | 4 | 2 |
|  | 20 | 1 | 1 | 1 | 1 | 1 | 1 | 1 |

As has been described, since the preparation of a semiconductor from titanium oxide in the oxidizing atmosphere is based only on the conversion of niobium oxide into a solid solution, the non-linear coefficient $\alpha$ presents the maximum value lower than that obtained with the sintering in a non-oxidizing atmosphere. However, the non-linear coefficient $\alpha$ obtained shows no difference from Example 1 in the range of more than 3. The non-linear voltage resistance element which has been sintered in an oxidizing atmosphere with the added amounts being in the aforesaid range may be used for the aforesaid applications.

EXAMPLE 3

Figure 4:
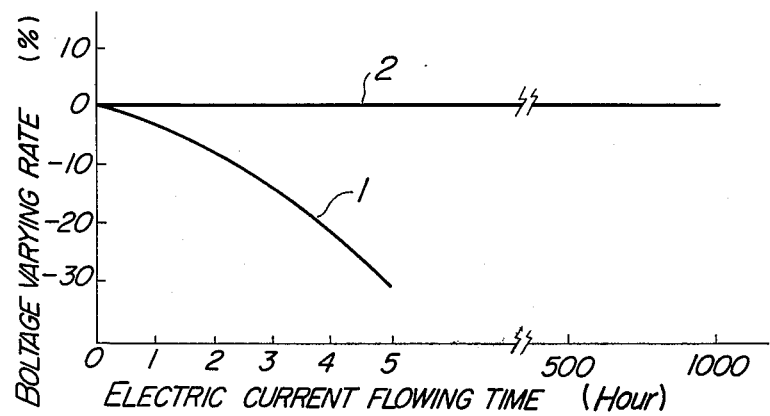
FIG. 4 is a plot comparing the non-linear voltage resistance element according to one embodiment of the invention with the conventional non-linear voltage resistance element with respect to the time-dependent change in a voltage varying rate.

FIG. 4 shows time-dependent characteristics of the non-linear resistance element obtained in Example 1, in which niobium oxide of 1 molar % and bismuch oxide of 1 molar % were added. In FIG. 4, reference numeral 4 represents a varying rate of a limiting voltage in duration of continuous flowing of an electric current through a non-linear zinc oxide base resistance element of the non-linear coefficient of 8 under a load of 1 watt. The resistance element used was prepared by adding bismuth oxide of 45 g, manganese oxide of 35 g and boron oxide of 5 g to zinc oxide of 920 g, mixing and forming same to dimensions of 12 mm $\phi$ in diameter × 5 mm in thickness, sintering same in an air atmosphere at 1,200°C and forming electrodes on the surfaces of the product by vacuum evaporation. The curve 3 represents the time-dependent varying rate of the limiting voltage for the non-linear coefficient of a resistance element obtained in Example 1 according to the invention, with the load being 1 watt. As can be seen from FIG. 4, the resistance element according to the present invention presents over 100 times current stability in comparison with said zinc oxide base resistance element.

It is admitted that if no more than 10% prohibiting voltage varying rate in a non-linear voltage resistance element is obtained in life test of 500 hours at 80°C under the load of 1 watt for a horizontal deflecting circuit for a television, the resistance element may be usable for an anticipated service life for televisions. The non-linear voltage resistance element according to the present invention presents a service life more than two times that for conventional non-linear resistant elements.

EXAMPLE 4

Figure 5:
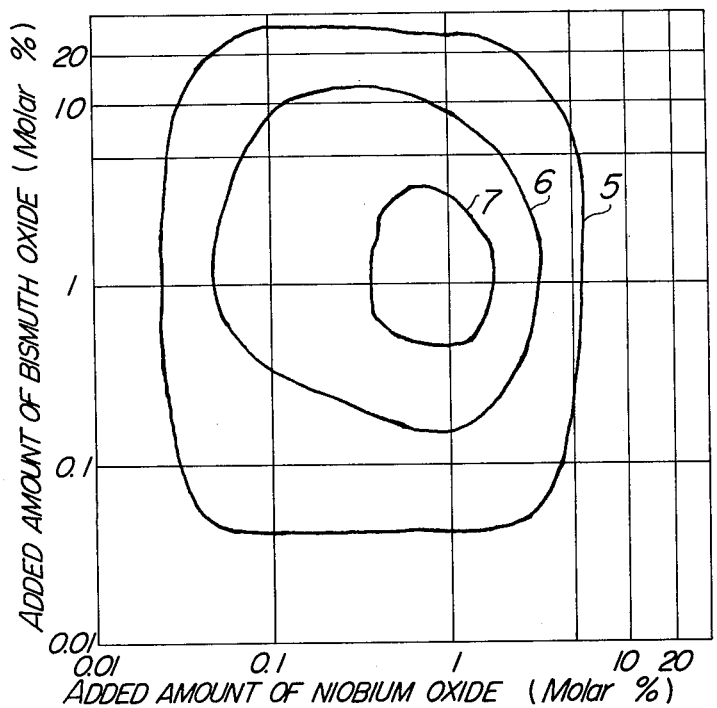
FIGS. 5 and 6 are plots showing the relationship between the voltage varying rate and the amounts of added materials in a non-linear voltage resistance element according to one embodiment of the invention.

FIG. 5 is a plot showing the relationship between added amounts of bismuth oxide and niobium oxide, and the duration in which the varying rate of the limiting voltage changed by 5%, in an element obtained in Example 1. The measurement was done in the same manner as in Example 3. The elements according to the present invention presented a varying rate of limiting voltage below 5% after the duration of 3,000 hours irrespective of the magnitude of the non-linear coefficient.

EXAMPLE 5

Figure 6:
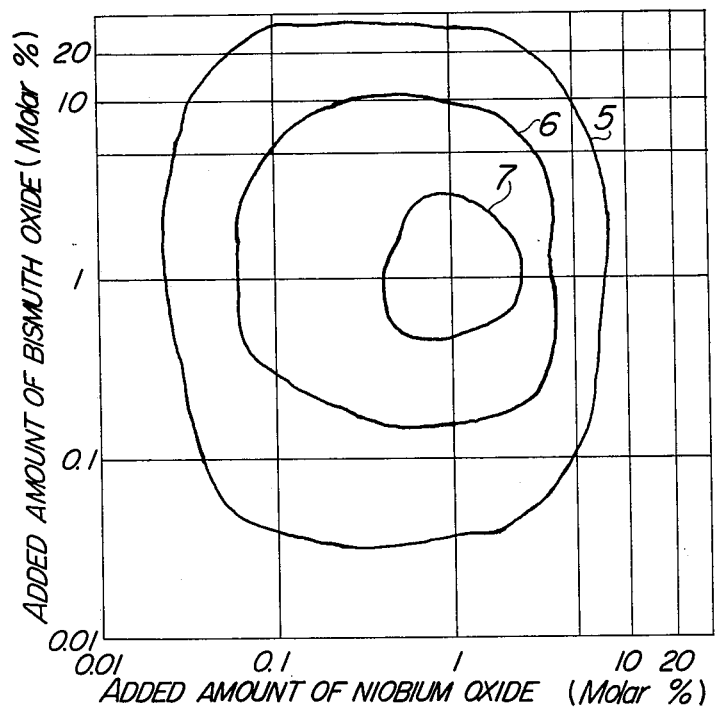

FIG. 6 shows the results of the tests in which the non-linear voltage resistance element obtained in Example 2 was tested in the same manner as in Example 4. The elements present a varying rate of limiting voltage of below 5% after the duration of 3,000 hours.

EXAMPLE 6

Figure 7:
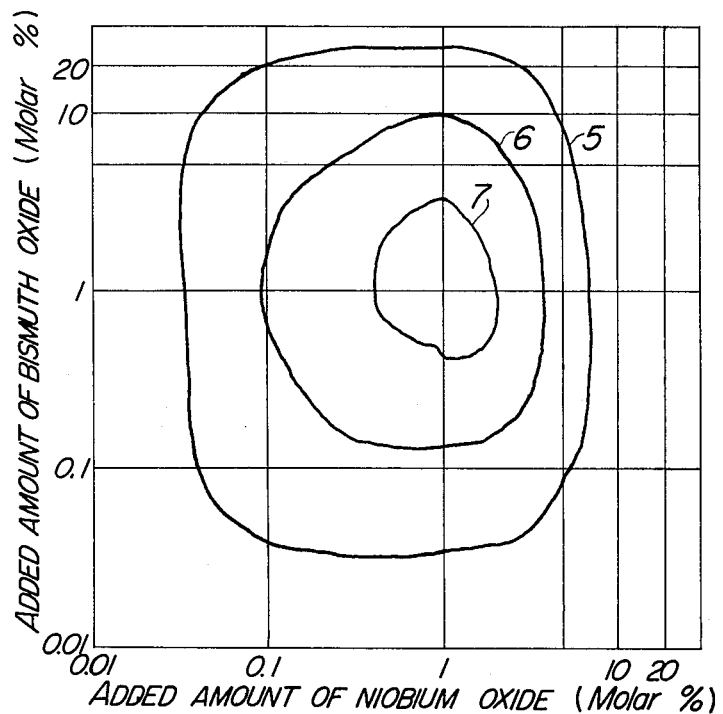
FIG. 7 is a plot of distribution showing the relationship between the non-linear coefficient and the amount of materials added in a non-linear voltage resistance element according to one embodiment of the invention.

FIG. 7 shows a plot of distribution showing the relationship between added amounts of bismuth oxide and niobium oxide, and the time-dependent varying rate of a non-linear coefficient $\alpha$ in the non-linear resistance elements obtained in Example 1. The measurement was carried out in which the non-linear coefficient after the duration of 3,000 hours under a load of 1 watt was measured. As can be seen from FIG. 7, the elements according to the present invention present the varying rate of the non-linear coefficient as low as 20%. Accordingly, it is noted that the elements are markedly superior to a conventional non-linear zinc oxide base resistance element in stability.

EXAMPLE 7

A non-linear resistance element of the same size as that obtained in Example 1 was obtained by adding niobium oxide and bismuth oxide by 1 molar % respectively to titanium oxide, forming in the same manner as in Example 1, but maintaining the resulting product at a different temperature of heat treatment from that in Example 1.

Figure 8:
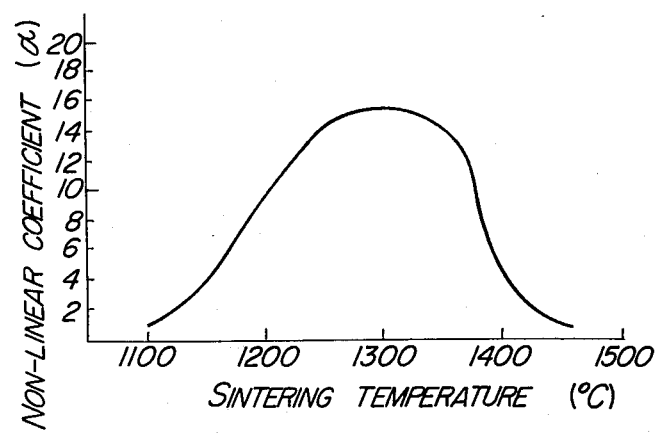
FIG. 8 is a curve showing the relationship between sintering temperature and non-linear coefficient $\alpha$ in a non-linear voltage resistance element of the invention.

FIG. 8 shows a plot of non-linear coefficients of non-linear resistance elements at varying sintering temperatures. The non-linear coefficient $\alpha$ is above 1 in the range from 1,200° to 1,400°C. The products, which were subjected to heat treatment at temperatures out of the range, present ordinary resistance elements. There were noted no presence of bismuth oxide having a low melting point at a sintering temperature above 1,400°C. On the other hand, due to a sintering temperature below 1,200°C, there will result insufficient sintering.

It has been found that the duration for holding the sintering temperature affects the non-linear coefficient. The products which had been maintained at a temperature of 1,400°C for 40 minutes presented a completely ordinary resistance element. However, in the products which had been maintained at a temperature below 1,350°C for over 2 hours, the non-linear coefficients presented no substantial difference. This explains that the non-linear resistance element of the present invention presents good non-linear voltage characteristics, when sintered sufficiently so as not to permit one of added components to evaporate.

As is apparent from the foregoing description, according to the present invention, an excellent non-linear resistance is obtained.

What is claimed is:

1. A non-linear voltage resistant element comprising a sintered body of a powdered metal oxide mixture, said mixture consisting essentially of 0.05 to 10 molar % of bismuth trioxide, 0.05 to 3 molar % of niobium pentaoxide, and the remainder being titanium oxide, said body being sintered at a sintering temperature no higher than the melting point of titanium oxide and no lower than a temperature at which a melt of metal oxides is produced in an oxidizing or non-oxidizing atmosphere.

2. A non-linear voltage resistance element according to claim 1, wherein the body is sintered in a non-oxidizing atmosphere and the stoichiometric bonding ratio of oxygen atoms to titanium atoms in titanium oxide contained in the sintered body is less than 2.

3. A non-linear voltage resistance element according to claim 1, wherein the sintering temperature is from 1000° to 1400°C.

4. A non-linear voltage resistance element according to claim 1, wherein the sintering temperature is from 1200° to 1400°C.

5. A non-linear voltage resistance element according to claim 1, wherein the body is sintered in an oxidizing atmosphere and titanium oxide contained in the sintered body is titanium dioxide.

6. A non-linear voltage resistance element according to claim 1, wherein said mixture contains 1 to 3 molar % of bismuth trioxide and 0.1 to 3 molar % of niobium pentaoxide.

7. A non-linear voltage resistance element according to claim 1, wherein the mixture contains from 1 to 3 molar % of bismuth trioxide and from 1 to 3 molar % of niobium pentaoxide.

8. A non-linear voltage resistance element according to claim 1, wherein the mixture contains from 0.1 to 10 molar % of bismuth trioxide and from 0.1 to 3 molar % of niobium pentaoxide.

9. A non-linear voltage resistance element according to claim 1, wherein the titanium oxide, niobium pentaoxide, and bismuth trioxide powders contained within said metal oxide mixture have a particle size that is from 50 to 325 mesh.

10. A non-linear voltage resistance element according to claim 1, wherein said body is sintered for a period of from 1 to 4 hours.

11. A non-linear voltage resistance element according to claim 1, wherein said sintered body contains particles of the titanium oxide surrounded by a layer of a melt of niobium pentaoxide and bismuth trioxide.

12. A non-linear voltage resistance element according to claim 1, wherein said element exhibits a non-linear coefficient $\alpha$ of from 1 to 16.

13. A titanium oxide base non-linear voltage resistance element comprising a formed and sintered body of metallic oxide powder, said metallic oxide powder consisting of bismuth trioxide powder of 0.05 to 10 molar %, niobium pentaoxide powder of 0.05 to 3 molar %, and titanium oxide powder in quantity of the remainder of said metallic oxide powder, and said body being sintered at 1000° to 1400°C. in a non-oxidizing atmosphere wherein the stoichiometric bonding ratio of oxygen atoms to titanium atoms in titanium oxide contained in the sintered body is less than 2.

14. A titanium oxide base non-linear voltage resistance element comprising a formed and sintered body of metallic oxide powder, said metallic oxide powder consisting of bismuth trioxide powder of 1 to 3 molar %, niobium pentaoxide powder of 0.1 to 3 molar %, and titanium oxide powder in quantity of the remainder of said metallic oxide powder, and said body being sintered at 1000° to 1400°C. in a non-oxidizing atmosphere wherein the stoichiometric bonding ratio of oxygen atoms to titanium atoms in titanium oxide contained in the sintered body is less than 2.

15. A titanium oxide base non-linear voltage resistance element comprising a formed and sintered body of metallic oxide powder, said metallic oxide powder consisting of bismuth trioxide powder of 1 to 3 molar %, niobium pentaoxide powder of 1 to 3 molar %, and titanium oxide powder in quantity of the remainder of said metallic oxide powder, and said body being sintered at 1000° to 1400°C. in a non-oxidizing atmosphere wherein the stoichiometric bonding ratio of oxygen atoms to titanium atoms in titanium oxide contained in the sintered body is less than 2.

* * * * *